(12) United States Patent
Raghavan et al.

(10) Patent No.: US 11,516,685 B2
(45) Date of Patent: Nov. 29, 2022

(54) SWITCHING BETWEEN FULL DUPLEX AND HALF DUPLEX IN MILLIMETER-WAVE NODES

(71) Applicant: QUALCOMM Incorporated, San Diego, CA (US)

(72) Inventors: Vasanthan Raghavan, West Windsor Township, NJ (US); Kapil Gulati, Hillsborough, NJ (US); Andrzej Partyka, Bedminster, NJ (US); Junyi Li, Chester, NJ (US); Jung Ho Ryu, Fort Lee, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 16/986,870

(22) Filed: Aug. 6, 2020

(65) Prior Publication Data

US 2021/0112429 A1 Apr. 15, 2021

Related U.S. Application Data

(60) Provisional application No. 62/915,612, filed on Oct. 15, 2019.

(51) Int. Cl.
*H04W 24/08* (2009.01)
*H04B 17/336* (2015.01)
(Continued)

(52) U.S. Cl.
CPC .......... *H04W 24/08* (2013.01); *H04B 17/318* (2015.01); *H04B 17/336* (2015.01); *H04L 5/14* (2013.01)

(58) Field of Classification Search
CPC ............... H04W 24/08; H04W 72/082; H04W 72/0433; H04W 72/046; H04W 88/085;
(Continued)

(56) References Cited

U.S. PATENT DOCUMENTS 11,140,695 B1 * 10/2021 Eyuboglu ......... H04W 72/1257
11,206,549 B1 * 12/2021 Eyuboglu ............ H04J 11/0073
(Continued)

OTHER PUBLICATIONS

International Search Report and Written Opinion—PCT/US2020/049831—ISA/EPO—dated Nov. 17, 2020.
Huawei, et al., "Enhancements on Multi-Beam Operation", Draft, 3GPP TSG RAN WG1 Meeting #98bis, R1-1910074, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), 18 Pages, Retrieved from the Internet: URL: https://ftp.3gpp.org/tsg_ran/WG1_RL1/TSGR1_98b/Docs/R1-1910074.zip R1-1910074.docx [retrieved on Oct. 5, 2019].
(Continued)

*Primary Examiner* — Peter P Chau
(74) *Attorney, Agent, or Firm* — Procopio, Cory, Hargreaves & Savitch LLP

(57) ABSTRACT

Systems, apparatuses, and methods for switching between full duplex and half duplex in wireless nodes. A wireless node may measure self-interference for one or more transmitter-receiver beam pairs. Based on the self-interference measurements, the wireless node may communicate on a beam pair in full duplex or half duplex. A duplex mode may be determined based on self-interference, as well as, optionally with other metrics such as rate and latency. A wireless node may switch between full duplex and half duplex based on the duplex mode determination. In addition, suitable beam pairs may be selected, along with associated duplex modes.

24 Claims, 7 Drawing Sheets

(51) Int. Cl.
*H04B 17/318* (2015.01)
*H04L 5/14* (2006.01)

(58) Field of Classification Search
CPC .. H04B 17/318; H04B 17/336; H04B 17/345; H04L 5/14
See application file for complete search history.

(56) References Cited

U.S. PATENT DOCUMENTS

| | | | |
|---|---|---|---|
| 11,271,699 B1* | 3/2022 | Eyuboglu | ............... H04L 41/16 |
| 2018/0234230 A1 | 8/2018 | Kalhan | |
| 2019/0021084 A1 | 1/2019 | Stirling-Gallacher et al. | |
| 2019/0260485 A1* | 8/2019 | Byun | .................... H04W 76/15 |
| 2020/0313779 A1* | 10/2020 | Kim | ..................... H04B 17/345 |
| 2020/0313837 A1* | 10/2020 | Vejlgaard | .............. H04L 5/1423 |
| 2022/0182160 A1* | 6/2022 | Su | ........................ H04B 17/309 |

OTHER PUBLICATIONS

Mediatek Inc: "Enhancements on Multi-Beam Operations", Draft, R1-1911047, 3GPP TSG RAN WG1 #98bis, 3rd Generation Partnership Project (3GPP), Mobile Competence Centre, 650, Route Des Lucioles, F-06921, Sophia-Antipolis Cedex, France vol. RAN WG1, No. Chongqing, China: Oct. 14, 2019-Oct. 20, 2019, Oct. 5, 2019 (Oct. 5, 2019), XP051808812, 10 Pages, Retrieved from the Internet: URL: https://ftp.3gpp.org/tsg_ran/WGI_RL1/TSGR1_98b/Docs/R1-1911047.zip R1-1911047 multi-beam operation.docx [retrieved on Oct. 5, 2019].

* cited by examiner

SWITCHING BETWEEN FULL DUPLEX AND HALF DUPLEX IN MILLIMETER-WAVE NODES

PRIORITY CLAIM AND CROSS REFERENCE TO RELATED APPLICATIONS

This application claims the benefit of priority of U.S. Provisional Application No. 62/915,612, entitled "SWITCHING BETWEEN FULL DUPLEX AND HALF DUPLEX IN MILLIMETER-WAVE NODES" and filed on Oct. 15, 2019, which is hereby expressly incorporated by reference herein in entirety as part of the disclosure of this application.

BACKGROUND

This disclosure relates generally to wireless communication, and more specifically, to techniques for switching between full duplex and half duplex in millimeter-wave nodes.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., Long Term Evolution (LTE) or New Radio (NR)). A wireless multiple-access communication system may include a number of base stations or access network nodes, each simultaneously supporting communication for multiple communication devices, which may be otherwise known as user equipment (UE).

SUMMARY

Systems, apparatuses, and methods are provided for switching between full duplex and half duplex in wireless nodes. A wireless node may measure self-interference for one or more transmitter-receiver beam pairs. Based on the self-interference measurements, the wireless node may communicate on a transmitter-receiver beam pair in full duplex or half duplex. A duplex mode may be determined based on self-interference, as well as, optionally with other additional metrics such as rate and latency. A wireless node may switch between full duplex and half duplex based on the duplex mode determination. In addition, suitable beam pairs may be selected, along with associated duplex modes.

From an aspect, a method of wireless communication is provided. The method may be performed by a wireless node or component(s) thereof. A metric of self-interference for a beam pair may be measured, wherein the beam pair comprises a transmitter (TX) beam and a receiver (RX) beam both at the wireless node. Furthermore, the wireless node may communicate on the beam pair in full duplex or half duplex based on the metric.

From another aspect, a wireless node is provided. The wireless node may include a memory and a processor coupled with the memory. The processor may be configured to measure a metric of self-interference for a beam pair, wherein the beam pair comprises a transmitter (TX) beam and a receiver (RX) beam both at the wireless node. The processor may be further configured to communicate, on the beam pair, in full duplex or half duplex based on the metric.

From another aspect, an apparatus of wireless communication is provided. The apparatus may include means for measuring a metric of self-interference for a beam pair, wherein the beam pair comprises a transmitter (TX) beam and a receiver (RX) beam both at a wireless node. The apparatus may also include means for communicating, on the beam pair, in full duplex or half duplex based on the metric.

From another aspect, a non-transitory computer-readable medium having instructions stored thereon is provided. The instructions may include codes executable for a wireless node to perform measuring a metric of self-interference for a beam pair, wherein the beam pair comprises a transmitter (TX) beam and a receiver (RX) beam both at the wireless node. The instructions may also include codes for communicating, on the beam pair, in full duplex or half duplex based on the metric.

From various aspects, an amount of interference from the TX beam to the RX beam of a beam pair may be measured. The metric of self-interference may include at least one of signal-to-interference-and-noise ratio (SINR), reference signal received power (RSRP), reference signal received quality (RSRQ), or signal-to-interference ratio (SIR).

From various aspects, the metric may be reported to a network entity for duplex mode determination. The network entity may be a central unit connected to one or more distributed wireless nodes.

From various aspects, a duplex mode for a beam pair may be determined based on the metric. According to an aspect, the beam pair may be selected over a different beam pair for full duplex based on the beam pair having lower self-interference. According to another aspect, the duplex mode may be determined based on a rate comparison between full duplex and half duplex for the beam pair.

From various aspects, the duplex mode may be determined further based on a latency constraint. According to an aspect, the beam pair with its associated duplex mode may be selected over a different beam pair based on the beam pair having a higher rate.

Various features and advantages of this disclosure are described in further details below. Other features will be apparent from the description, drawings, and/or the claims.

BRIEF DESCRIPTION OF THE DRAWINGS

Illustrative and non-limiting drawings are provided to aid in the description of various aspects and implementations. Unless specified otherwise, like reference symbols indicate like elements.

DETAILED DESCRIPTION

Figure 1:
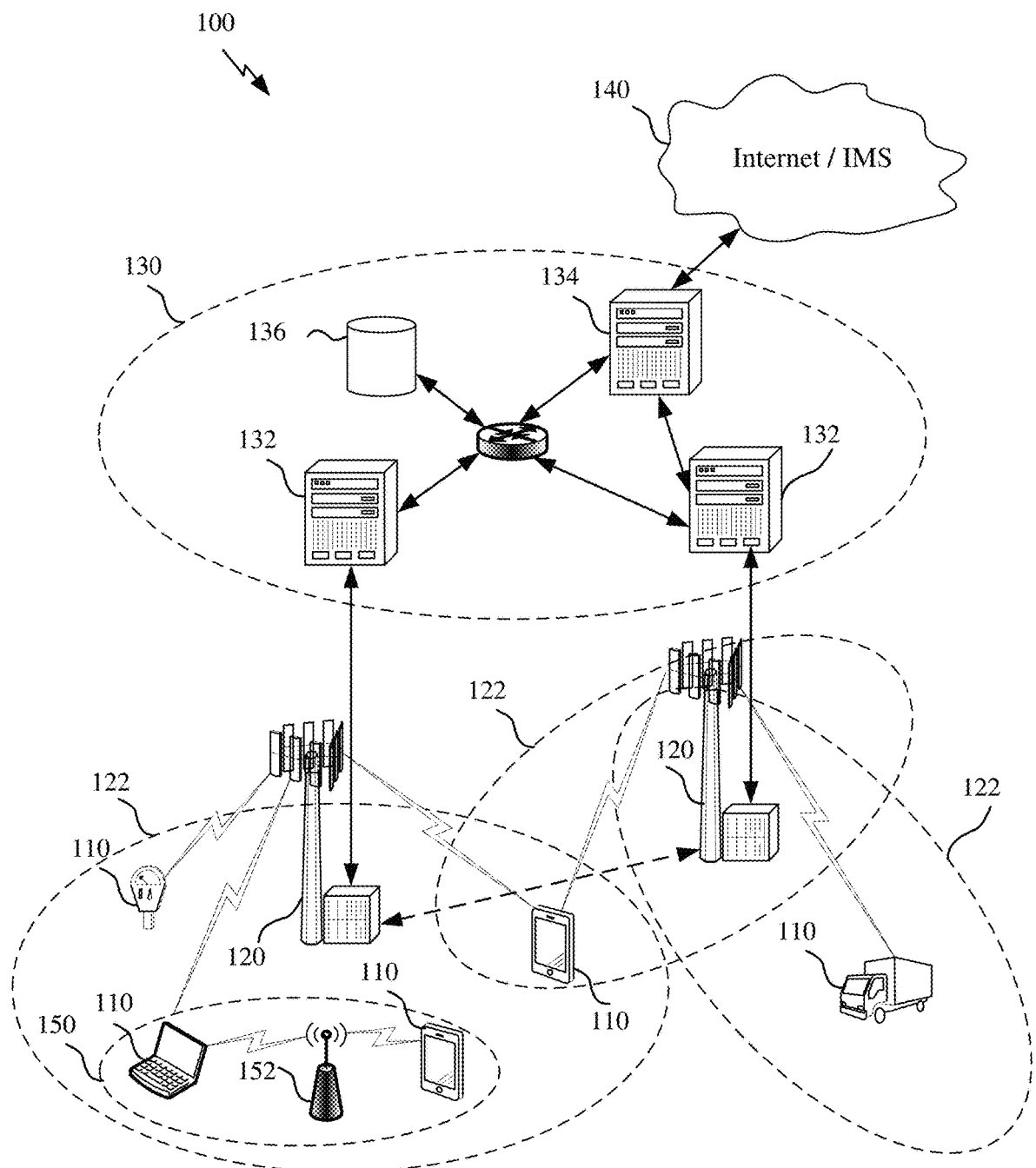
FIG. 1 illustrates an example of a wireless communication system in accordance with the present disclosure.

Communication on millimeter wave (mmWave) or Frequency Range 2 (FR2) is an important part of the fifth-generation (5G) NR systems and standards. Almost all current system designs are focused on half duplex (HD) in which wireless nodes alternate between transmission and reception in time. Though offering simpler implementation solutions, half duplex may not fully utilize the communication resources. In contrast, full duplex (FD) allows simultaneous transmission and reception at the same time, even at the same frequency in some cases, which may significantly increase performance over half duplex.

Full duplex systems nevertheless may behave differently from half duplex systems and entail different performance-cost tradeoffs. Simultaneous transmission and reception can result in increased rate and spectral efficiency, but the performance may be impacted by an enhanced self-interference from transmission part of the system to reception part of the system, e.g., as caused by clutters in the wave propagation environment. To mitigate self-interference, more complex circuitry for transmitter-receiver isolation may be used. Thus, the potential full duplex gain may be set off against negative impact of self-interference and other considerations (such as implementation cost and complexity). In some scenarios where FD performance gain can outweigh cost, full duplex may outperform half duplex, whereas the reverse may be true in other scenarios.

Since conditions favoring one duplex mode over the other may change, a holistic approach based on self-measurements may optimize system performance by dynamically selecting beams and/or switching between full duplex and half duplex on the beams depending on performance criteria and measurement metrics. For example, appropriate (perhaps different) wireless nodes for transmitter and receiver may be selected with corresponding beams/directions chosen to avoid self-interference. Generally speaking, a dense deployment of wireless nodes, with potential network coordination, may be more conductive to dynamic beam selection and duplex mode determination, because of sufficiently rich scattering around wireless nodes, availability of a good set of neighbor nodes, and/or strong coordination in neighbor node selection. However, not all deployments may be as favorable as described above; for example, only some strong directions may exist from a node to other nodes, only some viable neighbor nodes exist to establish links, or neighbor nodes can only be reached by beams or directions for which self-interference may not be avoided. Thus, in case when conditions may indicate that full duplex operation could be problematic, falling back to half duplex can achieve a more robust system performance.

Aspects of the disclosure introduced above are described below in the context of a wireless communication system. Illustrative and non-limiting examples of designs and techniques supporting switching between full duplex and half duplex for millimeter-wave communications are then described. Aspects of the disclosure are illustrated by and described with reference to various apparatus diagrams, system diagrams, and flowcharts.

FIG. 1 illustrates an example of a wireless communication system 100 in accordance with the present disclosure. The wireless communication system 100 generally include user devices (e.g., UEs 110) and network devices (e.g., base stations 120 and entities of a core network 130). Examples of the wireless communication system 100 may include various wireless network technologies, such as LTE or NR, as developed and standardized by the Third Generation Partnership Project (3GPP).

A user equipment generally refers to a device (e.g., of an end-user) that utilizes wireless communication service provided by a wireless communication network. As illustrated, a UE 110 may take a variety of forms, such as a cellphone, a computation device, a machine-type-communication (MTC) or Internet-of-Things (IoT) device, or a vehicular device, and so on. UEs 110 may be dispersed throughout the wireless communication system 100, and each UE 110 may be stationary or mobile. As used herein, a "user equipment" may also be referred to as a subscriber station, an access terminal, a remote terminal, a handset, a user device, a customer premises equipment, or generally a wireless communication device or some other suitable terminology in the context.

A base station generally refers to a network device that communicates wirelessly (e.g., via over-the-air radio channel) with user devices. Base stations 120 may communicate with one another and/or with the core network 130, e.g., through backhaul links or other network nodes. Base stations 120 often serve as entry points for a user equipment to access communication services provided by a wireless communication network. Base stations 120 (and in some examples, with other entities) may constitute a radio access network (RAN), which connects UEs 110 to the core network 130 via certain radio access technology (RAT), such as LTE or NR. In 3GPP context, a base station may be known as an evolved Node B (eNB) for LTE or a next generation Node B (gNB) for NR. But generally, as used herein, a "base station" may also be referred to as a base transceiver station, a radio base station, an access point, or some other suitable terminology in the context.

In general, a base station 120 may communicate with a UE 110 using communication resources in time, frequency, and/or space. Communication may occur in two directions: "downlink" (or "forward link") from the base station 120 to the UE 110; or in reverse, "uplink" (or "reverse link") from the UE 110 to the base station 120. Downlink and uplink transmissions may take place on same or different frequency bands and during same or different time instances. In terms of time resources, time intervals of transmission may be organized according to a "frame" structure. A frame may further be divided into a number of subframes or slots, each further containing a number of symbols, and so on. In terms of frequency resources, a variety of frequency bands (e.g., ranging from ultra-high frequency to extremely-high frequency) may be used. The frequency bands may be "licensed" (e.g., to an operator exclusively), or "unlicensed" (or "shared") (e.g., shared by general users subject to interference and coexistence regulation). On a frequency band, a "carrier" may generally refer to a set of radio frequency spectrum resources supporting uplink and/or downlink communication, such as transmission of physical signals or channels. In some examples a carrier may be made up of multiple sub-carriers (e.g., waveform signals of multiple different frequencies). In terms of spatial resources, base stations 120 and/or UEs 110 may communicate on one or more (physical or virtual) antenna ports, for example, based on various single-user or multi-user, Multiple-Input and Multiple Output (MIMO) techniques, such as spatial diversity, multiplexing, or beamforming, and so on. Multiple antennas may be co-located or distributed in diverse geographic locations.

A base station 120 may operate one or more "cells" 122. The term "cell" generally refers to a logical entity used for communication with a base station (e.g., over one or more carriers), and in some context, may also refer to a portion of a geographic coverage area (e.g., a sector) over which the logical entity operates. An identifier (e.g., a cell identity) may be associated with a cell to distinguish the cell from another cell. A UE 110 may register and communicate with one or more cells 122 (e.g., serving cells) while monitoring other cells 122 (e.g., neighbor cells).

The core network 130 may include a network of entities providing user authentication, voice/multimedia communications, Internet Protocol (IP) connectivity, and/or other application services. These entities may be referred to as nodes, servers, gateways, functions, or other suitable terminologies. Examples of the core network 130 may include an evolved packet core (EPC) in a LTE network, a 5G Core (5GC) in a 5G or NR network, or generally, other packet based network architecture. The core network 130, such as in 5GC, may separate user plane function from control plane function into different entities. The user plane generally handles transfer of user data, whereas the control plane exchange of network control information. A base station 120 in a radio access network may communicate with an entity 132 to access services of the core network 130. The entity 132 may incorporate a mobility management entity (MME) and/or a serving gateway (SGW), as in EPC, to implement control plane and/or user plane protocols. In other examples, the entity 132 may represent separate control plane or user plane functions, such as a core access and mobility management function (AMF) and/or a user plane function (UPF) in 5GC. The MME or AMF may provide control plane functionalities such as mobility, authentication, and/or bearer management for UEs 110 served by the base station 120. User data may be routed by the entity 132 through another entity 134, such as a PDN gateway (PGW) of EPC or a UPF of 5GC, connected to a packet data network (PDN) 140. The entity 134 may transport IP packets between the PDN 140 and a UE 110 accessing the PDN 140 via a base station 120 and the core network 130. The entity 134 may also provide IP address allocation as well as other functions. The core network 130 may also include other entities. For example, subscriber information or user profile may be stored in a server 136, such as a home subscriber server (HSS), which may be queried, e.g., for user authentication, registration, or billing, etc.

In general, a packet data network may be any packet (e.g., IP) based network. A UE 110 may communicate with the PDN 140 for a variety of applications or services. Examples of the PDN 140 may include an operator's service network, an IP Multimedia Subsystem (IMS), or generally the Internet. The IMS may provide voice, video, or other multimedia applications, such as voice over IP (VoIP) call, across various types of communication networks.

The wireless communication system 100 may represent a packet-based network that operates according to various layered protocol stacks. Multiple protocol layers (or sublayers) may reside in a UE 110, a base station 120, and an entity of a core network 130. For example, in the user plane, a Packet Data Convergence Protocol (PDCP) layer, with counterparts residing in a UE 110 and a base station 120, may provide wireless communication service for user data via data radio bearers (DRBs). Below PDCP may sit a Radio Link Control (RLC) layer, followed by a Medium Access Control (MAC) layer, and lastly by a Physical (PHY) layer, with counterparts residing in the UE 110 and the base station 120. In some examples (such as in NR), a Service Data Adaptation Protocol (SDAP) layer may be interfaced between an upper protocol stack (e.g., IP) and the PDCP, for example, to handle mapping between quality of service (QoS) flows and data radio bearers. The SDAP, PDCP, RLC, and MAC layer may correspond to sublayers of "Layer 2" (or Data Link Layer) in terms of Open Systems Interconnection (OSI) model, and the PHY layer the "Layer 1" (or Physical Layer). The SDAP layer may map between a QoS flow and a data radio bearer (DRB) and may also perform other QoS related operations. The PDCP layer may handle transfer of user data, header compression, in-sequence delivery, duplication detection, etc. The RLC layer may perform transfer of upper layer PDUs according to transmission modes, error correction through automatic repeat request (ARQ), segmentation/concatenation, etc. The MAC layer may handle multiplexing of logical channels into transport channels and may schedule uplink/downlink transmission or reception at the PHY layer. The MAC may also use hybrid automatic repeat request (HARQ) to provide retransmission at the MAC layer to improve link efficiency. The PHY layer may transmit information from MAC transport channels over the air interface. The PHY layer may also handle various aspects of power control, link adaptation, cell search, etc.

In the control plane, at a UE 110, an Non-Access Stratum (NAS) layer may lie on top of a Radio Resource Control (RRC) layer. The NAS layer may handle connection or session management between the UE 110 and a core network 130, whereas the RRC layer may handle radio resource management between the UE 110 and a base station 120. The RRC layer may correspond to "Layer 3" (or Network Layer) in the OSI model. The RRC layer may perform RRC connection management (including establishment, configuration, maintenance, and/or release) between the UE 110 and the base station 120, data and signaling radio bearer management, system information broadcast, mobility management, etc. In addition, the RRC layer may encapsulate and pass NAS messages between the UE 110 and the core network 130. For a respective peer layer (RRC or NAS) at the UE 110, a counterpart RRC layer may reside in the base station 120 and a counterpart NAS layer in an entity of the core network 130 (e.g., entity 132). Below the RRC, a PDCP layer may transfer NAS/RRC messages via signaling radio bearers (SRBs). Similar to the user plane, the PDCP may then be followed by RLC, MAC, and PHY, as generally described above with respect to the user plane.

The protocol stacks can provide for a variety of channels of communications. For examples, a set of "logic channels" may be provided for user and control data transfer between an RLC layer and a MAC layer; a set of "transport channels" between a MAC layer and a PHY layer; a set of "physical channels" may carry physical layer data and/or signals over the wireless medium (e.g., over the air interface) between a UE 110 and a base station 120. Generally speaking, a layer may receive, as an input, a service data unit (SDU) from a layer above, generate one or more protocol data units (PDUs), e.g., by adding headers to the received SDU, and pass the generated PDUs to a layer below for further processing.

Besides communicating with a wireless wide area network (WWAN), a UE 110 may communicate with a wireless local area network (WLAN), such as a Wireless-Fidelity (Wi-Fi) network. A WLAN 150 may include a wireless access point (AP), such as a wireless "hotspot" or "router" coupled to the Internet. A user device served by a wireless access point may also be referred to as an access terminal (AT). An AP 152 may wirelessly communicate with a UE 110 and may relay packetized communication data (e.g., IP packets) between the UE 110 and the Internet (or another AT). A WWAN (e.g., the core network 130) may support inter-networking (including aggregation) with a WLAN, and a UE 110 may communicate with both a base station 120 and an AP 152.

A UE 110, a base station 120, or an AP 152 may communication with one another in millimeter wave spectrum. Generally antenna arrays or panels can be used to direct signal energy in multiple directions or beams. A communication link from a first node to a second node can be realized through a transmitter beam at the first node and a receiver beam at the second node. As described in detail below, wireless nodes may switch between full duplex and half duplex based on self-interference measurements.

For illustrative purposes, the following examples and figures may be described with reference to the user or network devices of FIG. 1; however, other types of user or network devices may be used in same or other examples without limiting the scope of the present disclosure.

Figure 2A:
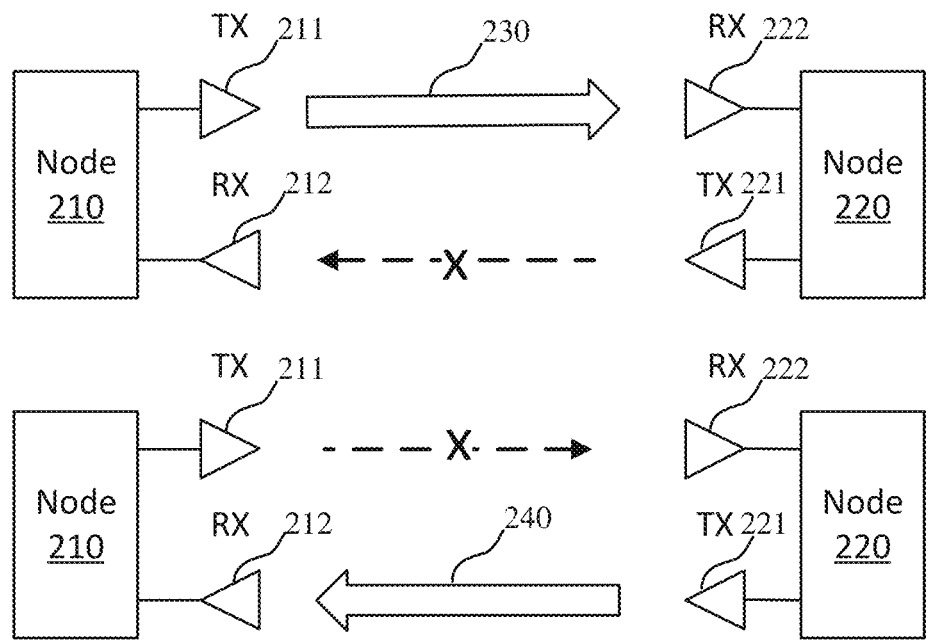
FIGS. 2A and 2B illustrates an example of half-duplex system and an example of full-duplex system.
Figure 2B:
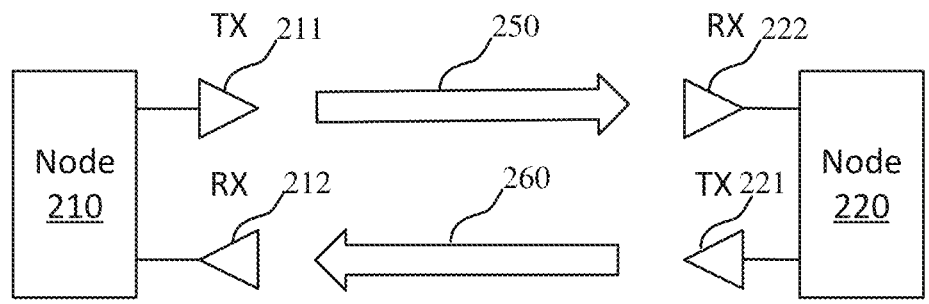

FIGS. 2A and 2B illustrate an example of half-duplex system and an example of full-duplex system, respectively. Two wireless nodes, e.g., node 210 and node 220, each equipped with a transmitter (TX) and a receiver (RX), may communicate with each other in a half-duplex mode (FIG. 2A) or in a full-duplex mode (FIG. 2B). The term "wireless node" refers to a broad variety of wireless communication devices. In particular, the node 210 or the node 220 can refer to either a UE 110 or a base station 120 as described in FIG. 1. Thus, communications between the node 210 and the node 220 may represent communications between a UE and a base station (e.g., as in uplink/downlink cellular communications), between two UEs (e.g., as in device-to-device communications), or between two base stations (e.g., as in backhaul communications). In general, a half-duplex or full-duplex node may transmit to and/or receive from different nodes, rather than a same node as depicted in the figures (for convenience of description).

As illustrated in FIG. 2A, half-duplex communications between two nodes may take place only on one direction at any given time. For example, while a node 210 may, at a particular time instance, transmit a signal/message to a node 220 on a direction (or path) 230, from a TX 211 at the node 210 to a RX 222 at the node 220, the node 210 may not simultaneously receive a signal/message from the node 220 on an opposite direction. In order for the node 210 to receive from the node 220, the two nodes may use another time instance during which the node 220 may transmit a signal/message to the node 210 on an opposite direction 240, from a TX 221 at the node 220 to a RX 212 at the node 210.

In contrast, as illustrated in FIG. 2B, full-duplex communications between two nodes can occur simultaneously on both directions. For example, at a given time instance, a node 210 and a node 220 can both transmit and receive signals/messages from each other, that is, on a direction 250 (from the node 210 to the node 220) and on an opposite direction 260 (from the node 220 to the node 210) at the same time. From the perspectives of a node, rather than being limited to either transmit or receive (but not both) in half duplex, the node in full duplex can simultaneously transmit and receive signals/messages.

Full duplex can be achieved in various ways. When multiple frequencies are available as in the case of frequency division multiple access or carrier aggregation, two communication directions may be assigned to resources separated in different frequencies. For example, communications on the direction 250 may take place in a carrier frequency, while the communications on the direction 260 another carrier frequency. Even at the same frequency, full duplex can be realized through separation in other communication dimensions, such as spatial dimension, code dimension, and so on. For example, in millimeter wave applications, a millimeter wave node may communicate with other nodes on a pair of transmitter and receiver beams separated in spatial dimensions.

Different duplex modes (full duplex or half duplex) generally entail different benefit and cost tradeoffs. Compared to half duplex, full duplex can significantly increase communication rate and spectral efficiency because simultaneous transmission and reception afforded by full duplex can lead to higher utilization of communication resources. On the other hand, a full-duplex implementation may impose higher cost/complexity than a half-duplex alternative. As further elaborated below, self-interference from the transmitter to the receiver poses a particular challenge in design and performance of full-duplex systems. More complex circuitry may be used to provide adequate TX to RX isolation for full-duplex operations.

Figure 3:
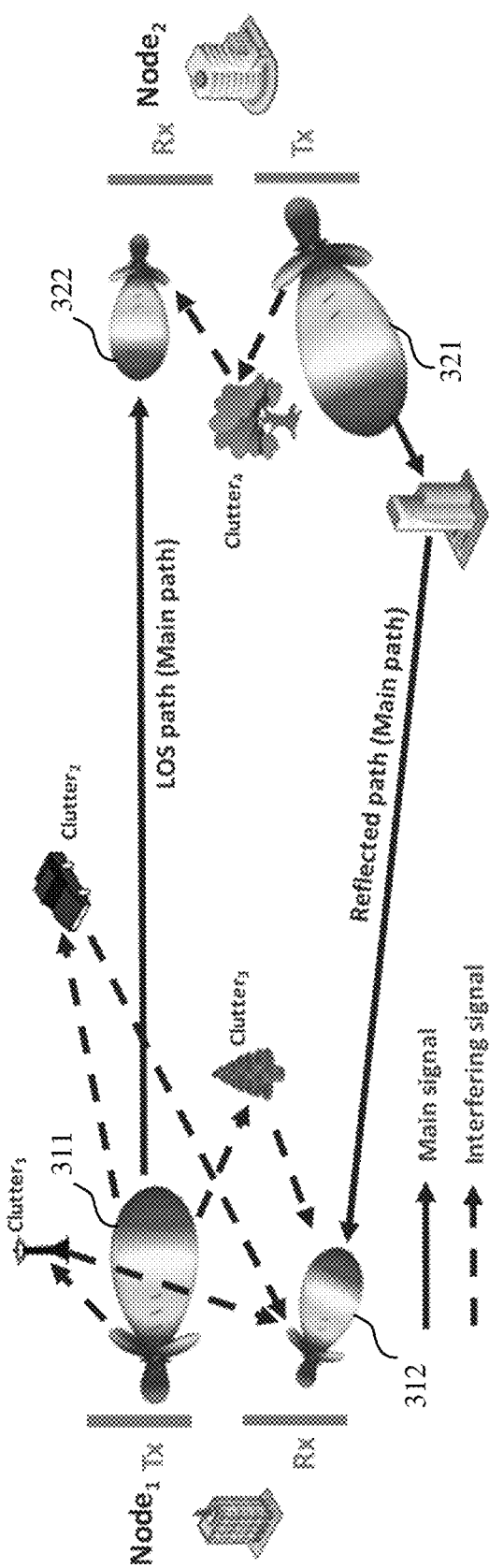
FIG. 3 illustrates impact of clutters on self-interference in full-duplex wireless nodes.

FIG. 3 illustrates impact of clutters on self-interference in full duplex wireless nodes. In millimeter-wave communication, wireless nodes generally communicate with each other on various transmitter (TX) and receiver (RX) beams created through multiple antennas. Narrow, highly directional beams in millimeter wave spectrum may provide sufficient spatial isolation to support full duplex wherein a millimeter-wave node may transmit on a TX beam and simultaneously receive on a RX beam. The scattering environments, clutters in particular, can impact the performance of full duplex communication.

For convenience of discussion, two nodes each with a pair of beams are shown in FIG. 3: a TX beam 311 and an RX beam 312 are at Node 1; a TX beam 321 and an RX beam 322 at Node 2. A line of sight (LOS) path from the TX beam 311 of Node 1 to the RX beam 322 of Node 2 constitutes a main path of communication direction from Node 1 to Node 2; a reflective path from the TX beam 321 of Node 2 to the RX beam 312 of Node 1 constitutes a main path of an opposite communication direction from Node 2 to Node 1. Intended signals/messages are transmitted and received on the main path of the respective communication direction. Generally speaking, a transmitted signal from a TX node in a certain direction may either reach a RX node or not, depending on wireless propagation environments. For example, if there are good or dominant clusters in the channel that reflect, diffract, or scatter the transmitted energy from the TX direction, then the signal is likely seen along the intended RX direction at the RX node. Otherwise, the transmitted energy may not be seen or sufficiently received at the RX node in the RX direction.

In half duplex, since a node may not transmit and receive at the same time, the above two paths are active only one at a time. Thus, when a node receives on its RX beam, its TX beam is silent, thus avoiding self-interference from TX beam to RX beam at the same node.

In full duplex, however, as a node may transmit and receive at the same time, transmission on a TX beam may cause self-interference on the reception on a RX beam of the same node. In some scenarios, self-interference by the TX beam could seriously degrade the quality of the received signal at the RX beam.

The presence and extent of self-interference generally depend on the presence, location, or other characters of clutters. A clutter is a reflector, diffractor, or scatterer in the environment that transfers energy from TX to RX. For example, as illustrated in FIG. 3, the RX beam 312 may receive interference from the TX beam 311 via Clutter 1, Clutter 2, and/or Clutter 3. Some of the clutters may be static (e.g., Clutter 1 and Clutter 2), others dynamic, moving, or time-varying (e.g., Clutter 3). Similarly, the TX beam 321 may cause interference to the RX beam 322 via Clutter 4. The interference can lead to reduced signal-to-interference-and-noise ratio (SINR) or other signal quality metrics on an RX path. An RX beam may experience different degrees of degradation depending on the direction of a self-interference signal path from a TX beam: more impact when the self-interference path comes towards the RX beam's main lobe rather than other directions, such as side lobes, because of higher reception of incoming signal at the main lobe. For example, as seen in FIG. 3, self-interference path via Clutter 3, hitting the main lobe of the RX beam 312, may cause more interference than other self-interference paths, via Clutter 1 or Clutter 2, hitting a side lobe.

Figure 4:
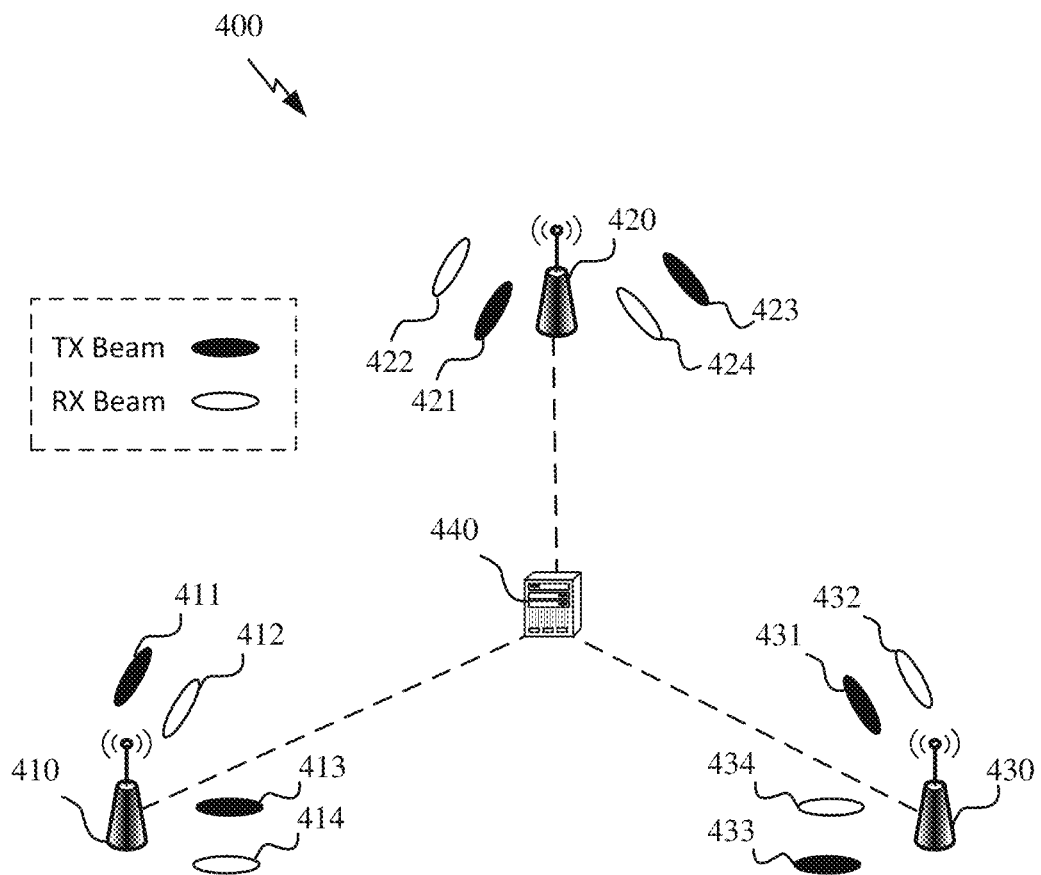
FIG. 4 illustrates an example of a network supporting duplex mode determination and switching in accordance with the present disclosure.

FIG. 4 illustrates an example of a network 400 supporting duplex mode determination and switching in accordance with the present disclosure. Multiple wireless nodes (e.g., millimeter-wave nodes) may communicate with one another on various transmitter and/or receiver beams. For example, a node 410 may transmit to a node 420 on a TX beam 411 and to a node 430 on a TX beam 413; it may receive from the node 420 on an RX beam 412 and from the node 430 on an RX beam 414. Similarly, the node 420 may transmit to the node 410 on a TX beam 421 and to the node 430 on a TX beam 423; it may receive from the node 410 on an RX beam 422 and from the node 430 on an RX beam 424. Correspondingly, the node 430 may transmit to the node 420 on a TX beam 431 and to the node 410 on a TX beam 433; it may receive from the node 420 on an RX beam 432 and from the node 410 on an RX beam 434.

A wireless node may communicate with one or more other wireless nodes on a "beam pair" comprising a transmitter beam and a receiver beam both at the same wireless node. In general, a wireless node can have multiple beam pairs. For example, at the node 410, a beam pair (TX beam 411 and RX beam 412) may provide a transmission link to, and reception link from, the node 420, whereas another beam pair (TX beam 411 and RX beam 414) may provide a transmission link to the node 410 but a reception link from the node 430.

A wireless node in the network 400 may communicate with one or more other nodes in half duplex or full duplex and may dynamically switch between the two duplex modes. A suitable pair of TX and RX beam and its associated duplex mode may be determined dynamically (e.g., as varying from slot to slot) or semi-statically (as static in a relatively longer time scale). Moreover, the determination can be implemented in a centralized or a decentralized manner. Although a determination unit 440 is shown in FIG. 4 as centralized, the techniques and principles described herein can readily be adapted to a decentralized implementation where an individual node may make autonomous decision with no or less input from other nodes. Generally speaking, a centralized determination may attain a global optimization in system performance across multiple wireless nodes.

The duplex mode may be determined based on self-interference measurements. A wireless node may perform "full-duplex beam training" to measure self-interference for one or more beam pairs at the wireless node. As generally described with reference to FIG. 3, self-interference for a beam pair in full duplex can significantly affecting full duplex performance, thus impacting the choice of full duplex or half duplex. The effect of self-interference may be measured in terms of various metrics, such as signal-to-interference-and-noise ratio (SINR), reference signal received power (RSRP), reference signal received quality (RSRQ), or signal-to-interference ratio (SIR).

A full-duplex beam training may generally involve a beam sweeping in either or both of TX and RX beams. For example, a wireless node may first sweep TX beams for a particular RX beam to measure self-interference for various corresponding beam pairs, and then repeat the TX beam sweeping for other RX beams. A wireless node may conduct beam training as a self-measurement procedure, separate from active data communications, or it may leverage active full-duplex communication sessions to gather interference statistics. In some cases, the beam training may involve a limited subset of potential beam pairs.

A beam pair may be chosen for full duplex based on the self-interference measurements. For example, a "good" TX/RX beam pair with lower self-interference may be used for communication in full duplex. In a decentralized design, a wireless node may determine which beam pair to use based on the result of beam training. In a centralized design, however, a wireless node may report the self-interference measurements (e.g., in a measurement report) to the determination unit 440. The determination unit 440 may aggregate self-interference measurements from more than one wireless node, determine suitable beam pairs and associated duplex modes for wireless nodes, and notify the wireless nodes of the determined beam pairs/duplex modes. In some cases, the (centralized) determination unit 440 may select a beam pair, which may not have the least self-interference locally at a particular wireless node but may deliver better performance globally with a corresponding beam pair at another wireless node.

The duplex mode and beam pair determination may be further based on rate measurement. There are situations where for a beam pair, full duplex may not necessarily outperform half duplex. For example, due to relatively high self-interference in full duplex, half duplex may produce higher communication rate (or throughput) despite having a less or poor utilization of communication resources. In one aspect, for a beam pair, the rate for full duplex taking into account the self-interference can be calculated and compared to the rate for half duplex with no self-interference but with a resource utilization loss. Depending on the rate comparison, either full duplex or half duplex may be chosen for the beam pair; for example, the duplex mode having higher rate may be selected. Based on rate measurements, beam pairs with associated duplex modes, having higher rates, may be selected and determined over other beam pairs having lower rates. In general, in centralized design, best beam pairs may be network coordinated and configured for optimal performance across a multitude of nodes served by the network. The network, e.g., via determination unit 440, may configure rate measurement, for example, defining an effective rate. In certain deployments (e.g., an Integrated Access and Backhaul Network or a cellular network with a central/intelligent entity), a wireless node may report measurements (e.g., self-interference and/or rate measurements) to a Central Unit (CU) which may determine a best beam pair and the effective rate for Distributed Units (DUs).

In addition, latency constraints can be taken into account for deciding between full duplex and half duplex. Because of simultaneous communications on two directions, full duplex may be preferred for low latency applications. For example, a very stringent latency constraint (e.g., below a threshold) may override the rate comparison (which might otherwise favor half duplex), if the achievable rate for full duplex, though lower than the rate for half duplex, can still support the application. For a less stringent latency, the latency loss due to half duplex may be weighted together with achievable rates for duplex mode determination. For example, gaming or mission critical applications can favor latency as a metric with more weightage than the achieved rates.

Figure 5:
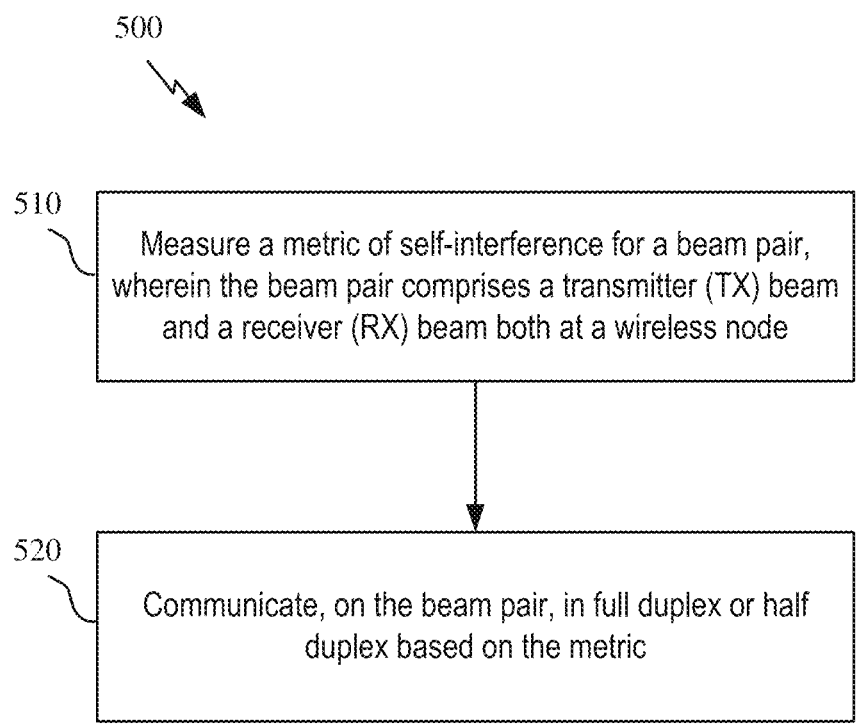
FIG. 5 illustrates an example of a method of wireless communication in accordance with the present disclosure.

FIG. 5 illustrates an example of a method 500 of wireless communication in accordance with the present disclosure. The method 500 may encompass various aspects of the techniques described with reference to FIG. 4. The method 500 may be performed by a wireless node (or its components). As in FIGS. 2A and 2B, the wireless node may refer to a UE, a base station, or other wireless communication device. In particular, the wireless node may be a millimeter-wave node that may transmit and receive wireless signals in millimeter wavelengths or bands. The method 500 may be implemented in hardware, firmware, or software, or a combination thereof.

At 510, a wireless node (e.g., a millimeter-wave node) may measure a metric of self-interference for a beam pair, wherein the beam pair comprises a transmitter (TX) beam and a receiver (RX) beam both at the wireless node. For example, the wireless node may measure self-interference for one or more beam pairs, using a general or limited beam training as described with reference to FIG. 4. In particular, for a particular beam pair, the wireless node may measure an amount of interference from the TX beam to the RX beam in full duplex. Various metrics can be measured, such as signal-to-interference-and-noise ratio (SINR), reference signal received power (RSRP), reference signal received quality (RSRQ), or signal-to-interference ratio (SIR), or some combinations thereof.

The determination for beam pairs and associated duplex modes can be made locally at the wireless node, or remotely at a central unit (e.g., the determination unit 440 in FIG. 4), or jointly by the wireless node and the central unit. In case of a centralized design, the wireless node may report the metric to a network entity for duplex mode determination. The network entity may be a central unit connected to one or more distributed wireless nodes. An example of the network entity may be a base station (or its components) determining duplex mode and/or beam pairs for UEs, distributed units, remote radio heads, etc., served by or connected to the base station. The network entity may notify various wireless nodes of the duplex mode/beam pair determination through control signaling or messages (e.g., RRC messages or MAC Messages); in response, the wireless nodes may receive such notification and apply the determination accordingly. In case of decentralized design, a wireless node may determine beam pair and/or duplex mode based on local self-interference measurements on its own TX beams and RX beams. In some scenarios, a wireless node may autonomously determine a suitable beam pair and its associated duplex mode, for example, by selecting a TX-RX beam pair for full duplex that has best SINR with least self-interference and/or higher rate compared to half duplex.

As generally described with reference to FIG. 4, the duplex mode (full duplex or half duplex) can be determined based on self-interference metric. Various performance metric, such as communication rate, may be derived from the self-interference metric. The duplex mode may be determined by the self-interference metric itself, derived metrics (such as rate), or combination thereof. Optionally non-interference criterion, such as latency, may additionally be used. In addition, the duplex mode determination may also select suitable beam pairs for one or more wireless nodes, based at least on the self-interference metrics. For example, a beam pair may be selected over a different beam pair for full duplex based on the beam pair having lower self-interference. For a beam pair, the duplex mode may be determined based on a rate comparison between full duplex and half duplex for the beam pair, based on self-interference metric. For example, a beam pair with its associated duplex mode may be selected over a different beam pair based on the beam pair having a higher rate. In addition, the duplex mode may be determined further based on a latency constraint.

At 520, the wireless node may communicate, on a beam pair, in full duplex or half duplex based on the (self-interference) metric. Based on the self-interference metrics, the wireless node may determine, or obtain determination of, a duplex mode for a beam pair. The wireless node may switch from half duplex to full duplex, or vice versa, depending on the determination.

Figure 6:
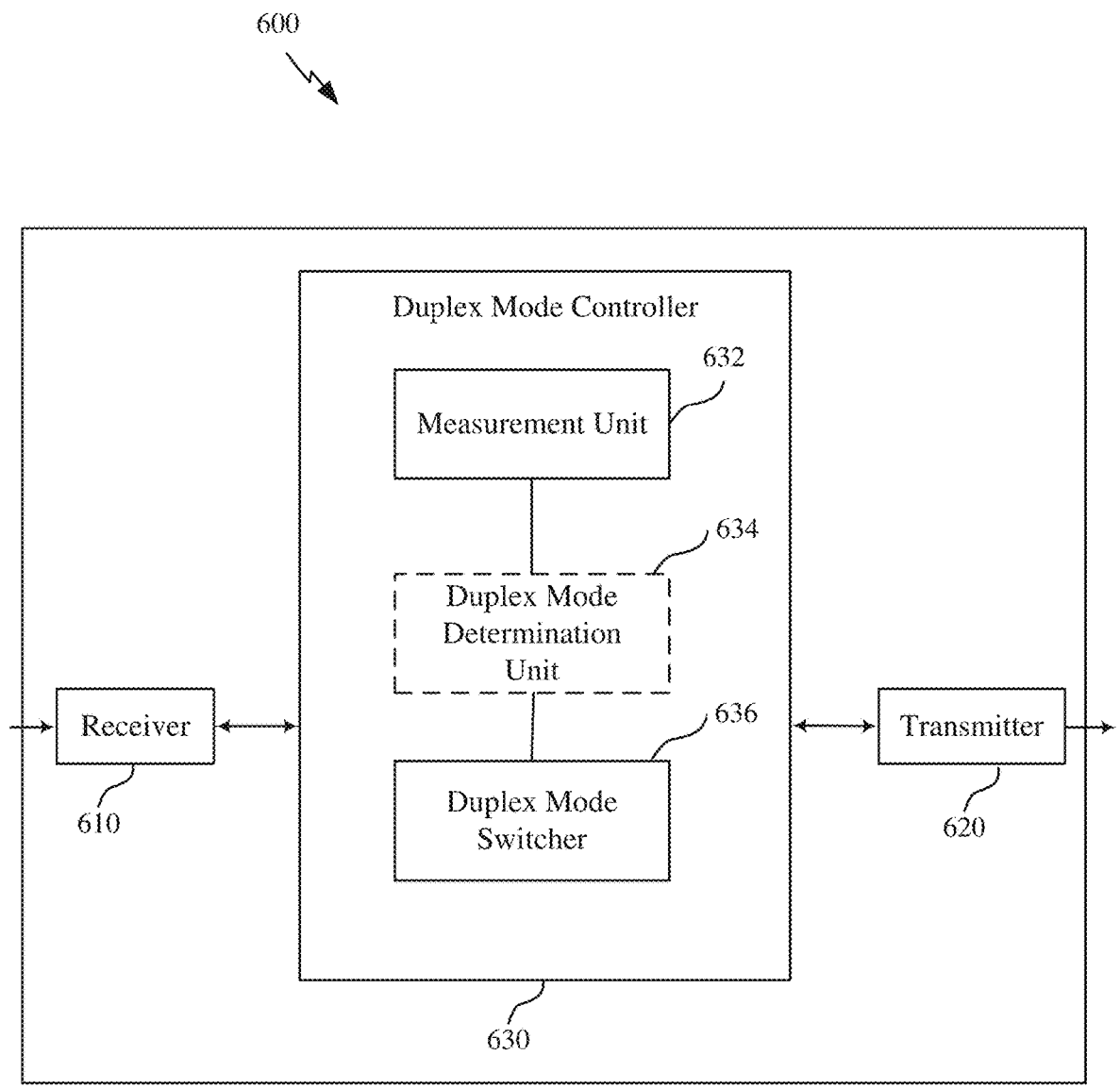
FIG. 6 illustrates an example of an apparatus in accordance with the present disclosure.

FIG. 6 illustrates an example of an apparatus 600 in accordance with the present disclosure. The apparatus 600 may be an example of a wireless node described above with reference to FIGS. 1-5. In particular, the apparatus 600 may include a receiver 610, a transmitter 620, and a duplex mode controller 630, and may perform various aspects of the method 500 described with reference to FIG. 5.

The receiver 610 may be configured to receive signals or channels carrying information such as packets, user data, or control information associated with various information channels. Information may be passed on to other components of the apparatus. The receiver 610 may utilize a single antenna or a set of multiple antennas, which may provide a set of one or more receiver (RX) beams.

The transmitter 620 may be configured to transmit signals or channels generated by other components of the apparatus. In some examples, the transmitter 620 may be collocated with a receiver 610 in a transceiver module. The transmitter 620 may utilize a single antenna or a set of multiple antennas, which may provide a set of one or more transmitter (TX) beams.

The receiver 610 and transmitter 620 (or a transceiver incorporating both) may be coupled to the duplex mode controller 630 and may provide means for communication between the apparatus 600 with other devices, such as wireless nodes (e.g., millimeter-wave nodes).

The duplex mode controller 630 may be a baseband modem or an application processor or may illustrate aspects of a baseband or application processor. The duplex mode controller 630 or at least some of its various sub-components may be implemented in hardware, software executed by a processor, firmware, or any combination thereof. Software may comprise codes or instructions stored in a memory or like medium that is connected or in communication with the processor described above. The codes or instructions may cause the processor, the apparatus 600, or one or more components thereof to perform various functions described herein.

The duplex mode controller 630 may control, coordinate, or execute various functions supporting switching between full duplex and half duplex for millimeter-wave communications. The duplex mode controller 630 may further include a measurement unit 632, an (optional) duplex mode determination unit 634, and a duplex mode switcher 636.

The measurement unit 632 may provide means for measuring a metric of self-interference for a beam pair, wherein the beam pair comprises a transmitter beam and a receiver beam both at a wireless node, and may, for example, be configured to perform the method 500 at 510 described with reference to FIG. 5.

The duplex mode switcher 636 may provide means for communicating, on a beam pair, in full duplex or half duplex based on the (self-interference) metric, and may, for example, be configured to perform the method 500 at 520 described with reference to FIG. 5. In particular, the duplex mode switcher 636 may switch between full duplex and half duplex according to a duplex mode determined or configured based on self-interference metric. The duplex mode may be switched dynamically or semi-statically.

The duplex mode controller 630 may optionally include the duplex mode determination unit 634 to determine duplex mode and/or beam pair in a local or decentralized manner. As described with reference to FIG. 4 and FIG. 5, the duplex mode determination unit 634 may determine duplex mode, and additionally select a suitable beam pair, for communication, based on self-interference metrics, as well as additionally based on rate, latency, or other performance criteria. In a centralized design, the duplex mode determination unit 634 may be absent. Alternatively, the duplex mode determination unit 634 may be adapted to interworking with a remote determination unit (e.g., determination unit 440 in FIG. 4), for example, reporting self-interference measurements (and/or other measurements, such as rates) to a network entity such as the remote determination unit, obtaining the determination (e.g., receiving notification) from the network entity, etc.

Figure 7:
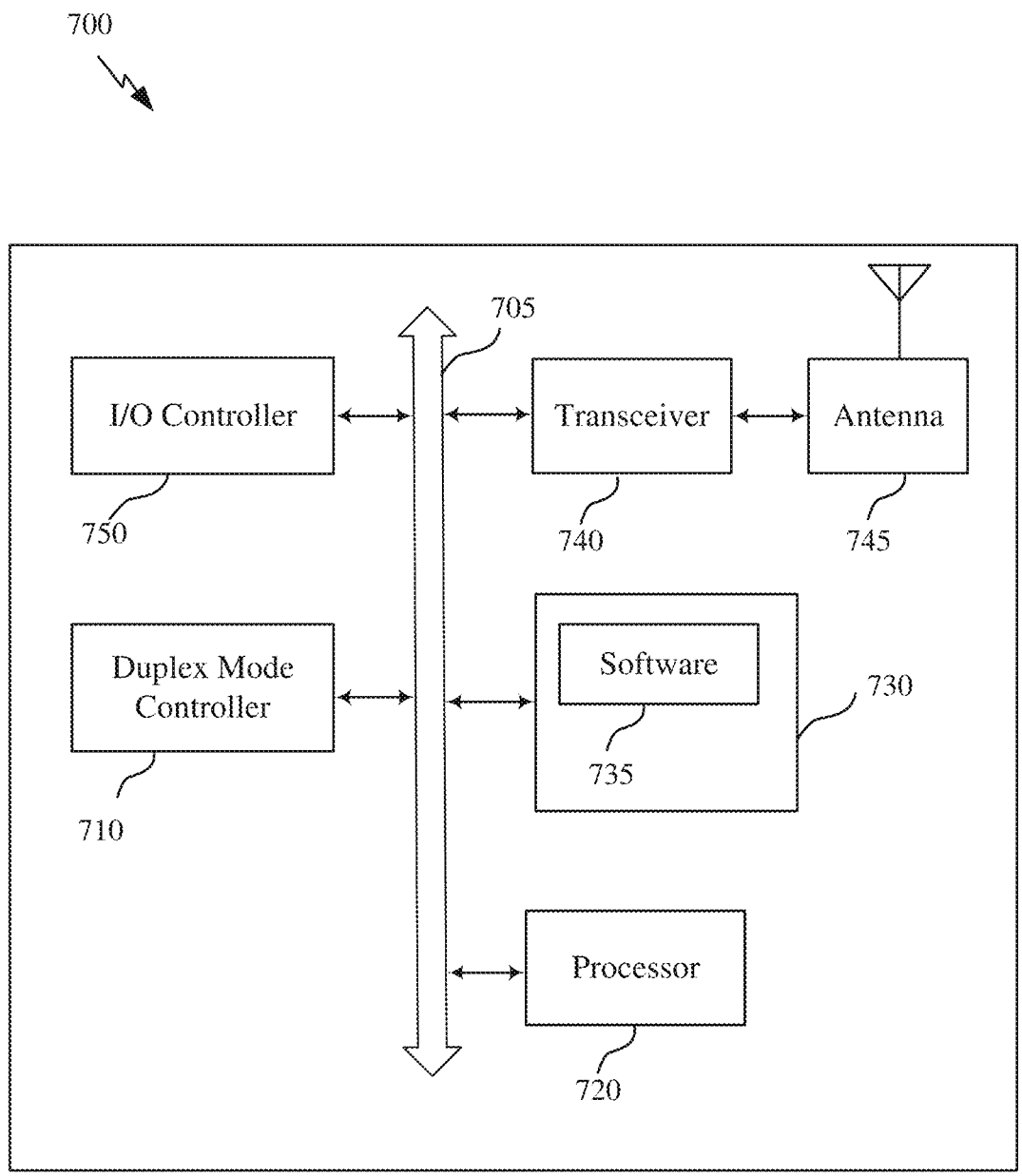
FIG. 7 illustrates an example of a wireless node in accordance with the present disclosure.

FIG. 7 illustrates an example of a wireless node 700 in accordance with the present disclosure. The wireless node 700 may be an example of the apparatus 600 described with reference to FIG. 6. The wireless node 700 may comprise duplex mode controller 710, processor 720, memory 730, software 735, transceiver 740, antenna 745, and I/O controller 750. These components may be coupled or in electronic communication via one or more buses (e.g., bus 705). The wireless node 700 may communicate wirelessly with other wireless nodes, e.g., in millimeter waves, on various transmitter and/or receiver beams.

The duplex mode controller 710 may perform various functions supporting switching between full duplex and half duplex for millimeter-wave communications. For example, the duplex mode controller 710 may be configured to measure a metric of self-interference for a beam pair, wherein the beam pair comprises a transmitter (TX) beam and a receiver (RX) beam both at a wireless node, and to communicate, on the beam pair, in full duplex or half duplex based on the metric. In some examples, the duplex mode controller 710 may implement the duplex mode controller 630 described with reference to FIG. 6. Generally speaking, the duplex mode controller 710 may utilize processor 720 and memory 730 to execute its functionalities.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions (e.g., software 735) stored in a memory (e.g., memory 730) to perform various functions.

Memory 730 may include random access memory (RAM) and/or read only memory (ROM). In some cases, the memory 730 may contain, among other things, a basic input/output system (BIOS) which may control basic hardware or software operation such as the interaction with peripheral components or devices. The memory 730 may store computer-readable, computer-executable software 735 including instructions that, when executed, cause the processor 720 (or the wireless node 700 generally) to perform various functions described herein.

Software 735 may include codes implementing aspects of the present disclosure, e.g., described with reference to FIGS. 4, 5 and 6. For example, the software 735 may include codes for measuring a metric of self-interference for a beam pair, wherein the beam pair comprises a transmitter (TX) beam and a receiver (RX) beam both at a wireless node, and for communicating, on the beam pair, in full duplex or half duplex based on the metric. Software 735 may be stored in a non-transitory computer-readable medium such as system memory or other memory. In some cases, the software 735 may not be directly executable by the processor but may cause a computer (e.g., when compiled and executed) to perform functions described herein.

Transceiver 740 may communicate bi-directionally, via one or more antennas, wired, or wireless links as described above. For example, the transceiver 740 may represent a wireless transceiver and may communicate bi-directionally with another wireless transceiver. The transceiver 740 may also include a modem to modulate the packets and provide the modulated packets to the antennas for transmission, and to demodulate packets from signals received from the antennas. In some examples, the transceiver 740 may include both the receiver 610 and the transmitter 620 described with reference to FIG. 6.

In some cases, the wireless node 700 may include a single antenna 745. However, in some cases the wireless node 700 may have more than one antenna 745, which may be capable of concurrently transmitting and/or receiving multiple wireless transmissions.

I/O controller 750 may manage input and output signals for the wireless node 700. I/O controller 750 may also manage peripherals not integrated into the wireless node 700. In some cases, I/O controller 750 may represent a physical connection or port to an external peripheral. In some cases, I/O controller 750 may utilize an operating system such as iOS®, ANDROID®, MS-DOS®, MS-WINDOWS®, OS/2®, UNIX®, LINUX®, or another known operating system. In other cases, I/O controller 750 may represent or interact with a modem, a keyboard, a mouse, a touchscreen, or other device. In some cases, I/O controller 750 may be implemented as part of a processor. In some cases, a user may interact with the wireless node 700 via I/O controller 750 or via hardware components controlled by I/O controller 750.

The description set forth herein, in connection with the appended drawings, describes example configurations and does not represent all the examples that may be implemented or that are within the scope of the claims. The term "exemplary," if used herein, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, the conjunction "or" shall generally be interpreted as "inclusive" unless the context indicates otherwise. For example, "A or B" would generally mean "either A, or B, or both" (but not necessarily "either A, or B, but not both"); in other words, the presented alternatives ("A" and "B") need not necessarily be mutually exclusive. Certain context, however, can indicate an "exclusive or," as in "whether A or not," for example.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include random access memory (RAM), read-only memory (ROM), electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communication, comprising:
   measuring a metric of self-interference for a beam pair, wherein the beam pair comprises a transmitter (TX) beam and a receiver (RX) beam both at a wireless node;
   determining a duplex mode for the beam pair based on the metric, wherein the duplex mode is determined based on a rate comparison between full duplex and half duplex for the beam pair; and
   communicating, on the beam pair, in full duplex or half duplex based on the metric and the determined duplex mode.

2. The method of claim 1, wherein said measuring comprises:
   measuring an amount of interference from the TX beam to the RX beam in full duplex.

3. The method of claim 2, wherein the metric comprises at least one of signal-to-interference-and-noise ratio (SINR), reference signal received power (RSRP), reference signal received quality (RSRQ), or signal-to-interference ratio (SIR).

4. The method of claim 1, further comprising:
   reporting the metric to a network entity for duplex mode determination.

5. The method of claim 4, wherein the network entity is a central unit connected to one or more distributed wireless nodes.

6. The method of claim 1, wherein the beam pair is selected over a different beam pair for full duplex based on the beam pair having lower self-interference than the different beam pair.

7. The method of claim 1, wherein the duplex mode is determined further based on a latency constraint.

8. The method of claim 1, wherein the beam pair with its associated duplex mode is selected over a different beam pair based on the beam pair having a higher rate than the different beam pair.

9. A wireless node, comprising:
   a memory; and
   a processor coupled with the memory, the processor configured to:

measure a metric of self-interference for a beam pair, wherein the beam pair comprises a transmitter (TX) beam and a receiver (RX) beam both at the wireless node;

determine a duplex mode for the beam pair based on the metric, wherein the processor is further configured to determine the duplex mode based on a rate comparison between full duplex and half duplex for the beam pair; and communicate, on the beam pair, in full duplex or half duplex based on the metric and the determined duplex mode.

10. The wireless node of claim 9, wherein the processor configured to measure the metric comprises the processor configured to:

measure an amount of interference from the TX beam to the RX beam in full duplex.

11. The wireless node of claim 10, wherein the metric comprises at least one of signal-to-interference-and-noise ratio (SINR), reference signal received power (RSRP), reference signal received quality (RSRQ), or signal-to-interference ratio (SIR).

12. The wireless node of claim 9, wherein the processor is further configured to:

report the metric to a network entity for duplex mode determination.

13. The wireless node of claim 12, wherein the network entity is a central unit connected to one or more distributed wireless nodes.

14. The wireless node of claim 9, wherein the processor is further configured to select the beam pair over a different beam pair for full duplex based on the beam pair having lower self-interference than the different beam pair.

15. The wireless node of claim 9, wherein the processor is further configured to determine the duplex mode further based on a latency constraint.

16. The wireless node of claim 9, wherein the processor is further configured to select the beam pair with its associated duplex mode over a different beam pair based on the beam pair having a higher rate than the different beam pair.

17. A non-transitory computer-readable medium having instructions stored thereon, the instructions comprising codes executable for a wireless node to perform:

measuring a metric of self-interference for a beam pair, wherein the beam pair comprises a transmitter (TX) beam and a receiver (RX) beam both at the wireless node;

determining a duplex mode for the beam pair based on the metric, wherein the duplex mode is determined based on a rate comparison between full duplex and half duplex for the beam pair; and communicating, on the beam pair, in full duplex or half duplex based on the metric and the determined duplex mode.

18. The non-transitory computer-readable medium of claim 17, the instructions further comprising codes executable for the wireless node to perform:

measuring an amount of interference from the TX beam to the RX beam in full duplex.

19. The non-transitory computer-readable medium of claim 18, wherein the metric comprises at least one of signal-to-interference-and-noise ratio (SINK), reference signal received power (RSRP), reference signal received quality (RSRQ), or signal-to-interference ratio (SIR).

20. The non-transitory computer-readable medium of claim 17, the instructions further comprising codes executable for the wireless node to perform:

reporting the metric to a network entity for duplex mode determination.

21. The non-transitory computer-readable medium of claim 20, wherein the network entity is a central unit connected to one or more distributed wireless nodes.

22. The non-transitory computer-readable medium of claim 17, wherein the beam pair is selected over a different beam pair for full duplex based on the beam pair having lower self-interference than the different beam pair.

23. The non-transitory computer-readable medium of claim 17, wherein the duplex mode is determined further based on a latency constraint.

24. The non-transitory computer-readable medium of claim 17, wherein the beam pair with its associated duplex mode is selected over a different beam pair based on the beam pair having a higher rate than the different beam pair.

* * * * *